Patented Mar. 31, 1936

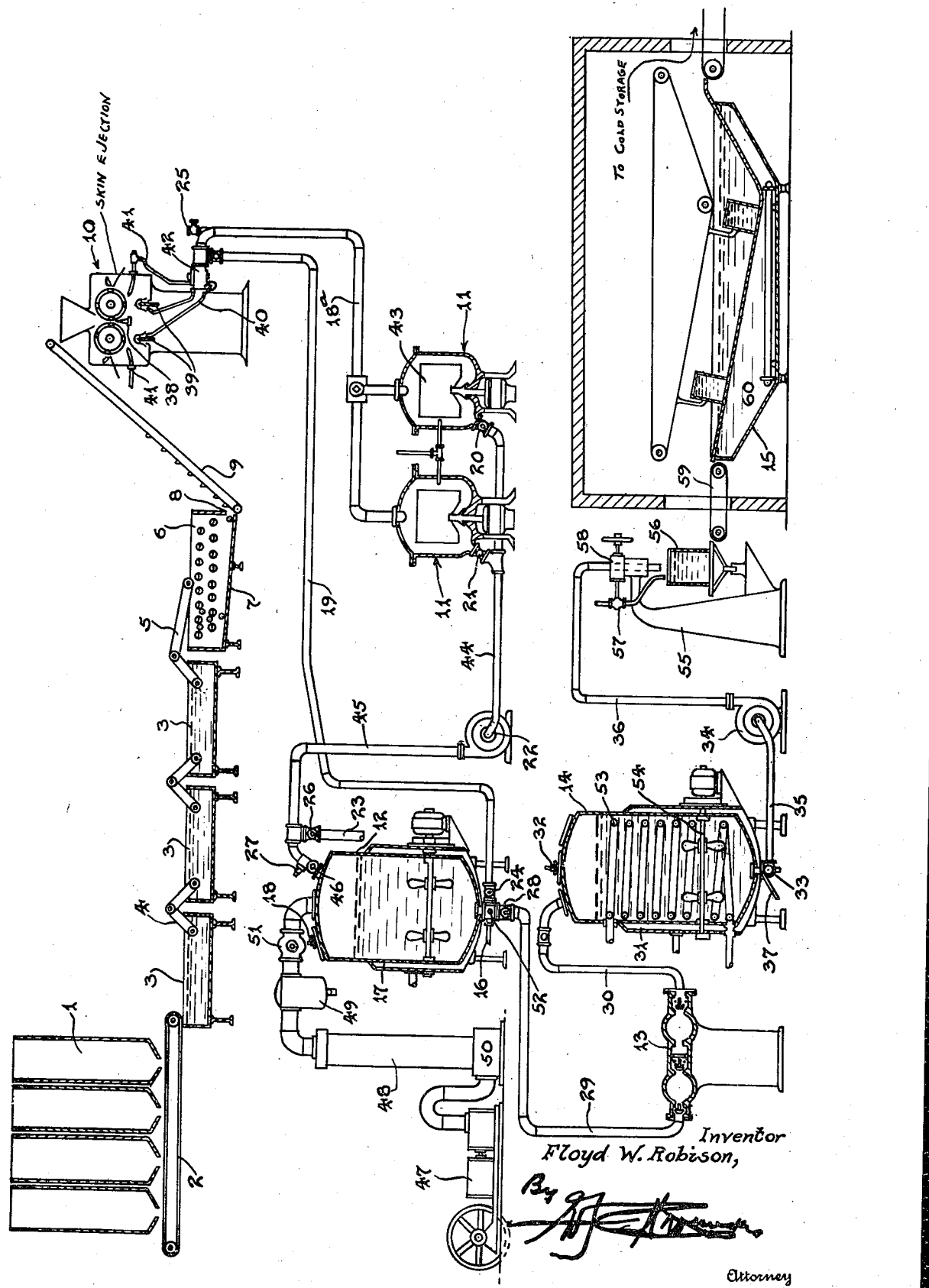

2,035,619

UNITED STATES PATENT OFFICE 2,035,619

PROCESS OF TREATING FRUIT JUICES

Floyd W. Robison, Detroit, Mich., assignor of two-fifths to Harry J. Porter and one-fifth to Geoffrey D. Elmer, both of Detroit, Mich.

Application April 20, 1934, Serial No. 721,619

6 Claims. (Cl. 99—8)

The present invention relates to the treatment of fruit juices, particularly juices from the citrous fruits—orange, tangerine, lemon, grapefruit, pineapple; malic juices, such as apple; tartrate juices, such as grape, and mixed acid juices, such as raspberry, blackberry, cranberry and loganberry.

The treating of these fruit juices, expressed from sound, whole fruit, is conducted in such manner that said juices retain their original non-free oxygenous, sterile condition and unimpaired freshness, and that said original condition is maintained by non-exposure of the juices to free oxygen, during juice extraction and subsequent steps of processing, and packaging.

The process further relates to a method of maintaining the original non-free oxygenous, sterile condition and unimpaired freshness, flavor and aroma of the packaged juices, by so treating said packaged juices that a condition of intramolecular immobility is imposed, permitting indefinite suspension in cold storage, until consumer use.

Attempts have been made to process and store fruit juices, out of contact with free oxygen, as explained in patent to Manning, 1,686,096, wherein a vacuum in a receptacle for expressing juice is relied on for removing free oxygen from the juice extracting mechanism co-incident with juice extraction from the fruit.

Also as explained in patent to Heyman, 1,527,304, attempts have been made to remove from fruit juice free air entrained therein and to throwout of solution free air dissolved by the fruit juice, but it is impossible to repair the injury resulting from the exposure of fruit juice to air and restore the juice to its condition before exposure to air. Recognition of the deleterious effect of oxygen on fruit juice, absorbed or entrained as the juice is extracted from the fruit, is made in patent to Stephens 1,883,420; and as an offset it is suggested that in the preparatory stages that after being thoroughly cleaned the sound ripe fruit be sliced mechanically and the juice extracted therefrom under a blanket of carbon dioxide or other heavy neutral gas but the only process and apparatus disclosed in the said patent to Stephens relates to the introduction of carbon dioxide gas into the processing receptacle during the pasteurization of the fruit juice for de-oxygenation purposes in freeing the orange juice of residual oxygen.

It is an established fact that the fruit juice before extraction is sterile and non-free oxygenous, and it is obvious that fruit juices, when exposed to the atmosphere, absorb quantities of free oxygen, and become therefore permanently oxidized, inasmuch as no subsequent removal of free oxygen from said juices, corrects the degree of oxidation previously established.

It is the object of the present invention in carrying out the said process to first completely sterilize the apparatus employed in the said process and simultaneously remove the free oxygen from the said apparatus and then maintain the apparatus in the said non-free oxygenous sterile condition while the fruit juice is being processed so that the fruit juice will not come in contact with any free oxygen in the said apparatus.

It is also an object of the invention to enable streams of non-oxidizing gas to play directly upon the knife and reamers of the fruit slicing and juice extracting machine of the apparatus and also maintain a stream of non-oxidizing gas through the juice conduit of the said machine and thereby produce and maintain a high pressure gas area around the said parts of the fruit slicing and juice extracting machine so that the expressed fruit juice will be positively prevented from coming in contact with free air and all danger of oxidation of the fruit juice during the extracting of the same from the fruit eliminated.

It has been observed that attempts to market fruit juice, particularly orange, have been seriously handicapped by the reluctance of the consumer to accept a product which, upon standing, separates. That is, the solids, as represented by the pulp content, and the liquids are not fixed in permanent dispersion, by straining or freezing; and it is an object of the present invention to reduce the juice to a homogeneous, uniform condition, of stable dispersion, wherein no particle of fruit juice exceeds two microns in size, whereby the product will be presented to the consumer in a highly attractive and satisfactory condition.

It has also been found that, while theoretically the exterior of fruit and the apparatus through which its extracted juice must flow, may be rendered sterile, the sterility of the juice in actual manufacturing practice may not be absolute. Since it is obvious that any temperature approaching pasteurization definitely destroys the original flavor and aroma of fruit juices, it is an object of the present invention to enable the present process to be carried out at a temperature which will not impair the original flavor and aroma of fruit juices and to provide means for maintaining, immobile, any micro-organisms which may be present in the juice, after the expressing operation or as the result of subsequent processing so that the fruit juice after processing may be stored indefinitely without liability of the fruit juice being impaired through bacterial activity.

Another object of the invention is to extract fruit juice from the fruit in its original, non-free oxygenous and sterile condition and in the processing of the juice to create an avidity for some satisfying gas factor and to supply a non-oxidizing gas and satisfy the said gas avidity of the juice and thereby establish a non-oxidizing gas lock for maintaining the fruit juice in the said original non-free oxygenous and sterile condition throughout the completion of the processing and throughout the packaging and storing of the fruit juice.

In the drawing:—

The figure of the drawing is a diagrammatic view of the apparatus for carrying out the process of the present invention.

The component parts of the apparatus are standard equipment and includes means for cleansing and treating the exterior of fruit so that it is substantially sterile. The said means comprises a battery of fruit receiving hoppers 1 and an endless conveyor 2 located beneath the hoppers 1 for conveying the fruit from the hoppers to a plurality of tanks 3, each containing a suitable bath for cleaning and sterilizing the fruit which is transferred from one tank to another by standard conveyors 4. The fruit after being subjected to the baths of the tanks 3 is transferred by a suitable conveyor 5 to a receptacle 6 having an inclined bottom 7 and provided at the lower end thereof with an outlet 8 through which the fruit is discharged upon an inclined endless conveyor 9 adapted to carry the fruit from the receptacle 6 to a fruit slicing and juice extracting machine 10. The extracted juice is then strained by centrifugal strainers 11 and conveyed to a processing tank 12 and after being treated as hereinafter fully explained, is passed through a homogenizer 13 and treated in a cooling tank 14 after which the juice is packed and passed through a freezing tank 15 and transferred to cold storage.

Recognizing the established fact that the juice within the whole fruit is sterile and non-free oxygenous, it is obvious that fruit juices, when exposed to the atmosphere, absorb or take on quantities of free oxygen, and become permanently oxidized, inasmuch as no subsequent removal of free oxygen from said juices, corrects the degree of oxidation previously established.

The first objective, therefore, in the process of the present invention, is the creation of a non-free oxygenous and sterile condition of the apparatus in which the fruit cutting, juice extracting, juice transfer and subsequent processing is accomplished.

To bring about this condition the process tank 12 is first filled with water through valve 16. When the tank 12 is completely filled, steam is admitted to jacket 17 and the water contained within the tank 12 is brought to an active boiling condition. Vapor and expanded water generated in the tank escape through a self-closing pressure relief valve 18 which constitutes an automatic vent for the processing tank 12. The de-aerated water thus produced is admitted to juice conduit 18ª and the centrifugal strainers 11 by means of pipe line 19. After an interval of about five minutes, valves 20 and 21 are opened, and a centrifugal pump 22 is started, and a drain is effected at 23 in an amount equal to not less than the displaced volume of apparatus concerned. A valve 24 in the pipe line 19 is then closed stopping the flow of de-aerated water. Valve 61 is then also closed sealing pipe line 19.

At this point a pre-regulated flow of a non-oxidizing gas is admitted through a valve 25 in the pipe line 18ª, thereby forcing out the water in this drain of apparatus at drain 23. When a clear flow of gas is observed at 23 the drain is closed by a valve 26 and the gas is permitted to escape at a pressure relief valve 27 located between the drain and the processing tank. The passage of boiling water which has been de-aerated has effectively produced in this train of apparatus, a sterile and non-free oxygenous condition and the continued passing of non-oxidizing gas maintains the said condition in the affected parts of the apparatus.

The boiling water in the processing tank 12 is now passed through valve 28 and through a juice conduit 29, the homogenizer 13, juice conduit 30 and into the cooling tank 14. When the pumping action of the homogenizer 13 has accomplished this result, the valve 28 is closed, leaving the processing tank 12 completely non-free oxygenous. Steam is admitted to jacket 31 of the cooling tank 14 and producing active boiling of the water in the said tank 14, the vapor pressure being relieved by an automatically operating pressure relief valve 32.

The valve 33 located at the bottom of the tank 14 is then opened and a pump 34 forces the de-aerated water from the cooling tank 14 through juice lines 35 and 36. The valve 33 is then moved to its drain position and all the water but enough to cover the drain outlet is permitted to drain from the tank 14. The steam is then shut off from the jacket 31 and the gas valve 37 is opened sufficiently to relieve the vacuum in the tank 14 caused by condensing vapor. The entire train of apparatus is now sterile and completely non-free oxygenous and is maintained in this condition by the continued exclusion of free oxygen through the application of the non-oxidizing gas which may be carbon dioxide or any other suitable or equivalent gas.

Assuming now fruit juices are to be treated, the whole fruit is lifted by the elevator 9 to the infeed mechanism of the fruit slicing and juice extracting machine 10. The slicing knife 38, reamers 39 and juice conduit 40 of the fruit slicing and juice extracting machine are bathed in a stream of non-oxidizing gas discharged at a comparatively high velocity from nozzles 41 extending into the fruit slicing and juice extracting machine and so disposed that the stream of gas from the nozzles play directly upon said knife 38 and reamers 39, and through the juice conduit 40, maintaining a high pressure gas area at these points.

The nozzles permit the use of gases of any desired density and thus avoid the inevitable dilution of such a gas with oxygen where gravity alone is depended upon for maintaining a gas area for excluding free oxygen.

The control valve 42 of the fruit slicing and juice extracting machine 10 is opened to permit the fruit juice to flow by gravity in the maintained atmosphere of the non-oxidizing gas to the centrifugal strainers 11. The centrifugal straining of the juice through the rotary centrifugal baskets 43 is accomplished under a continuous pre-regulated flow of non-oxidizing gas which passes, with the juice, through the conduits 44 and 45 and through the pump 22 into the processing tank and through an open valve 46 located at the top of the processing tank and controlling the flow of fruit juice into the same. The gas pressure accumulating in the processing tank 12 is relieved through the automatic pressure relief vent valve 18. When an amount of juice equaling ⅗ the capacity of the processing tank 12 is delivered to the latter the previous fruit juice treating operations, except the flow of non-oxidizing gas through the apparatus to the valve 27, are stopped by shutting down parts of the apparatus.

At this point the juice inlet valve 46 at the top of the processing tank 12 is closed, and the steps of the process for accomplishing a non-oxidizing gas lock against oxygen absorption by the fruit juice is started. In this connection it will be seen that a complete absence of oxygen has thus far been maintained and a positive non-oxidizing gas content established. It has been found that such non-free oxygenous juices may be treated under reduced pressures, in combinations with sufficient applied heat to produce active ebullition, at a temperature not exceeding 100° F. In such condition, the juices rapidly yield their content of non-oxidizing gases, thereby creating avidity for some satisfying gas factor. For satisfying this avidity of the juice for gas non-oxidizing gas, inert if 100% pure, or active, if non-oxidizing, may be used.

Steam is admitted to the jacket 17 and the contents of the processing tank 12 are raised in temperature to 100° F. This temperature is maintained through the agency of a thermostatic steam valve (not shown). A double acting vacuum pump 47 exerts through a condenser 48 and a trap 49 a sufficiently dimished pressure on the fruit juice previously heated to 100° F. to produce active ebullition.

Since there is head room above the fruit juice, equalling ⅖ the capacity of the tank, the vacuum pull affects expanding gases only. In their passage through the condenser 48 the water vapor is deposited in a receiver 50. The other gas not absorbed by the water in the receiver passes thorugh the vacuum pump 47 to the atmosphere. The treatment above described is continued until one gallon condensate is observed in the receiver 50. This unit of measurement equals in excess of eight volumetric displacements of the non-liquid containing portion of the processing tank 12.

At this point in the process the valve 51 is closed and steam to the jacket is shut off and a gas valve 52 communicating with the interior of the tank 12 at the bottom thereof is opened, admitting non-oxidizing gas, until a vacuum pressure gauge (not shown) registers five pounds. This admission of the non-oxidizing gas to the tank 12 replaces diminished pressure within the tank 12 with gas, thereby satisfying the gas avidity of the juice, just previously attained. A non-oxidizing gas lock in the juice is thus established.

In order to overcome the heretofore serious handicap resulting from the reluctance of the consumer to accept a product, which upon standing, separates, that is, a juice in which the solids as represented by the pulp content, and the liquids, are not fixed in permanent dispersion, the fruit juice is passed through the homogenizer 13. The five pounds gas pressure in the tank 12 is employed for forcing the juice to the homogenizer 13 where it is subjected to a pressure of 2000 pounds per square inch, and this pressure of juice to force said juice through a small orifice against an impact ring, the velocity attained being approximately 1000 feet per second. The impact at this velocity reduces the juice to a homogeneous, uniform condition, no particle of which exceeds two microns in size and a condition of stable dispersion is thus attained.

The homogenizer 13 being in effect a pump, forces the juice through conduit 30 into the cooling tank 14. The juice is cooled to a temperature of +32° F. through the agency of an ammonia coil 53. An agitator 54 enhances this operation. During the period required to reduce the juice to a temperature of +32° F., a stream of non-oxidizing gas is forced through said juice from the bottom of the cooling tank 14 at inlet 37 and escapes through the automatic pressure relief vent valve 32.

The action of the homogenizer 13, by dividing more finely the particles of fruit juice, establishes in said fruit juice, under temperature reduction, a greater affinity for and, consequently, greater absorption of non-oxidizing gas, in addition to effecting a condition of stable dispersion.

The filling and packaging operation consists in conveying the fruit juice from the cooling tank 14 through the conduits 35 and 36 by the pump 34 to a filling and capping machine 55. As the juice flows into a container 56 from the filling machine outlet a slight increase in temperature of the juice takes place, and the resultant expansion releases a small quantity of entrained non-oxidizing gas in the container 56, thereby effectually preventing the juice from coming in contact with free oxygen. A gas spray 57 controlled co-incident with a juice release valve 58 establishes a high pressure gas area within the container 56, and around the juice outlet, and as the filling operation is completed, the non-liquid receiving portion of the container is maintained in a condition free from oxygen prior to capping the container and the operation of capping the container is performed without free oxygen entering the container 56 and coming in contact with the fruit juice.

It has been found that, while theoretically the exterior of fruit and the apparatus through which its extracted juice must flow, can be rendered sterile, the sterility of the juice, in actual manufacturing practice may not be absolute. Since it is obvious that any temperature approaching pasteurization definitely destroys the original flavor and aroma of fruit juices, the fruit juice in the process of the present invention is never raised to a temperature where the original flavor and aroma of the fruit juice are impaired, and in order to take care of a condition where the sterility of the fruit juice may not be absolute, the present method maintains immobile any micro-organisms which may be present in the fruit juice after the expressing operation and as a result of subsequent processing. This is accomplished by the following treatment. A conveyor 59 carries the container 56 to the freezing tank 15 where the immersion of said container 56 in a brine solution 60 of −10° F. is so arranged that it progresses the length of the tank, at an angle to the surface of the brine, the immersion and freezing being complete at the end of the tank.

It will be seen that by pre-cooling the fruit juice in the cooling tank 14 to a temperature of +32° F., just above the freezing point, the immersion of the contained juice in a −10° F. solution in such manner that the freezing action is confined to extremely limited vertical areas, the freezing point curve, and the saturation point curve are made to intersect in this area, thereby effecting saturation or equilibrium and thus preventing uneven crystalline formation and also effectually preventing development of micro-organisms. The freezing takes place at the point where there is 100% saturation of the sugar and other soluble solids. The freezing is quickly effected before any separation takes place between the liquids and the solids. The contents of the container 56 are frozen gradually from the bottom to the top of the container until the entire contents are uniformly frozen.

What is claimed is:—

1. A method of the class described for maintaining fruit juices in their original non-free oxygenous and sterile condition, which comprises cutting the fruit and extracting the juice in a non-free oxygenous atmosphere by first displacing free oxygen with a high velocity flow of non-oxidizing gas, then maintaining a high velocity stream of non-oxidizing gas on the fruit, the cutting means, the extracting means and the extracted juice and thereby produce a high pressure area of said gas at this point, and then treating said juice by heating at a sub-barometric pressure sufficient to cause active ebullition, thereby driving off entrained and absorbed non-oxidizing gas to produce a condition of great avidity for a gas satisfying factor and then supplying said gas satisfying factor by introducing under pressure sufficient non-oxidizing gas to relieve said sub-barometric pressure and impose a positive gas pressure on the juice thereby establishing a non-free oxygenous gas lock in the fruit juice.

2. A method of the class described for maintaining fruit juices in their original non-free oxygenous and sterile condition, which comprises cutting the fruit and extracting the juice in a non-free oxygenous atmosphere by first displacing free oxygen with a high velocity flow of non-oxidizing gas, then maintaining a high velocity stream of non-oxidizing gas on the fruit, the cutting means, the extracting means and the extracted juice and thereby produce a high pressure area of said gas at this point, then treating said juice in a sterile and non-free oxygenous tank by heating to approximately 100° F. at a sub-barometric pressure sufficient to cause active ebullition, thereby driving off entrained and absorbed non-oxidizing gas to produce a condition of great avidity for a satisfying gas factor and then supplying said satisfying gas factor by introducing under external pressure sufficient non-oxidizing gas to relieve the sub-barometric pressure within the tank and impose a positive gas pressure, thereby establishing a non-free oxygenous gas lock in the fruit juice.

3. A method of the class described for maintaining fruit juices in their original non-free oxygenous and sterile condition, which comprises cutting the fruit and extracting the juice in a non-free oxygenous atmosphere by first displacing free oxygen with a high velocity flow of non-oxidizing gas, then maintaining a high velocity stream of non-oxidizing gas on the fruit, the cutting means, the extracting means and the extracted juice and thereby produce a high pressure area of said gas at this point, then treating said juice by heating at a sub-barometric pressure sufficient to cause active ebullition, thereby driving off entrained and absorbed non-oxidizing gas to produce a condition of great avidity for a gas satisfying factor and then supplying said gas satisfying factor by introducing under pressure sufficient non-oxidizing gas to relieve said sub-barometric pressure and impose a positive gas pressure on the juice thereby establishing a non-free oxygenous gas lock in the fruit juice, and then subjecting said fruit juice to high pressure velocity impact reducing said fruit juice to a homogeneous uniform condition, no particle of which exceeds two microns in size, and thereby establishing a condition of stable dispersion.

4. A method of the class described for maintaining fruit juices in their original non-free oxygenous and sterile condition, which comprises cutting the fruit and extracting the juice in a non-free oxygenous atmosphere by first displacing free oxygen with a high velocity flow of non-oxidizing gas, then maintaining a high velocity stream of non-oxidizing gas on the fruit, the cutting means, the extracting means and the extracted juice and thereby produce a high pressure area of said gas at this point, and then treating said juice by heating at a sub-barometric pressure sufficient to cause active ebullition, thereby driving off entrained and absorbed non-oxidizing gas to produce a condition of great avidity for a gas satisfying factor and then supplying said gas satisfying factor by introducing under pressure sufficient non-oxidizing gas to relieve said sub-barometric pressure and impose a positive gas pressure on the juice thereby establishing a non-free oxygenous gas lock in the fruit juice, packaging the juice, and then treating the packaged juice by passing the packages through a freezing solution at an angle to the surface of the solution and imposing a freezing action confined to extremely limited vertical areas to freeze the juice gradually in the packages and maintain immobile the intra-molecular non-oxidizing gas lock and any micro-organisms which may be present.

5. A method of the class described for maintaining fruit juices in their original non-free oxygenous and sterile condition, which comprises cutting the fruit and extracting the juice in a non-free oxygenous atmosphere by first displacing free oxygen with a high velocity flow of non-oxidizing gas, then maintaining a high velocity stream of non-oxidizing gas on the fruit, the cutting means, the extracting means and the extracted juice and thereby produce a high pressure area of said gas at this point, then treating said juice in a sterile and non-free oxygenous tank by heating to approximately 100° F. at a sub-barometric pressure sufficient to cause active ebullition, thereby driving off entrained and absorbed non-oxidizing gas to produce a condition of great avidity for a satisfying gas factor, then supplying said satisfying gas factor by introducing under external pressure sufficient non-oxidizing gas to relieve the sub-barometric pressure within the tank and impose a positive gas pressure, thereby establishing a non-free oxygenous gas lock in the fruit juice, packaging the juice, then treating the packaged juice by passing the packages through an approximately −10° F. brine solution at an angle to the surface of the brine, imposing a freezing action confined to extremely limited vertical areas, the approximately +32° F. temperature of the juice and the approximately −10° F. temperature of the brine tending to cause the saturation point curve and the freezing point curve to intersect in this area, effecting practically complete saturation and preventing uneven crystalline formation and maintaining immobile the intra-molecular non-oxidizing gas lock and any micro-organisms which may be present.

6. A method of the class described for maintaining fruit juices in their original non-free oxygenous and sterile condition, which comprises cutting the fruit and extracting the juice in a non-free oxygenous atmosphere by first displacing free oxygen with a high velocity flow of non-oxidizing gas, then maintaining a high velocity stream of non-oxidizing gas on the fruit, the cutting means, the extracting means and the extracted juice and thereby produce a high pressure area of said gas at this point, then treating said juice in a sterile and non-free oxygenous tank by heating to approximately 100° F. at a sub-barometric pressure sufficient to cause active ebullition, thereby driving off entrained and absorbed non-oxidizing gas to produce a condition of great avidity for a satisfying gas factor, then supplying said satisfying gas factor by introducing under external pressure sufficient non-oxidizing gas to relieve the sub-barometric pressure within the tank and impose a positive gas pressure, thereby establishing a non-free oxygenous gas lock in the fruit juice, then subjecting the fruit juice to high pressure velocity impact reducing said juice to a homogeneous uniform condition, no particle of which exceeds two microns in size and thereby establishing a condition of stable dispersion, packaging the juice, then treating the packaged juice by passing the packages through an approximately −10° F. brine solution at an angle to the surface of the brine, imposing a freezing action confined to extremely limited vertical areas, the approximately +32° F. temperature of the juice and the approximately −10° F. temperature of the brine tending to cause the saturation point curve and the freezing point curve to intersect in this area, effecting practically complete saturation and preventing uneven crystalline formation and maintaining immobile the intra-molecular non-oxidizing gas lock and any micro-organisms which may be present.

FLOYD W. ROBISON.